(12) United States Patent
Tsai et al.

(10) Patent No.: US 12,105,406 B2
(45) Date of Patent: Oct. 1, 2024

(54) HEAT DISSIPATION MODULE AND PROJECTION DEVICE

(71) Applicant: Coretronic Corporation, Hsin-Chu (TW)

(72) Inventors: Te-Ying Tsai, Hsin-Chu (TW); Jia-Hong Dai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 924 days.

(21) Appl. No.: 16/740,465

(22) Filed: Jan. 12, 2020

(65) Prior Publication Data

US 2020/0233287 A1 Jul. 23, 2020

(30) Foreign Application Priority Data

Jan. 23, 2019 (CN) .......................... 201910061935.3

(51) Int. Cl.
*G03B 21/16* (2006.01)
*F21V 29/67* (2015.01)
(Continued)

(52) U.S. Cl.
CPC ............ *G03B 21/16* (2013.01); *F21V 29/673* (2015.01); *F21V 29/767* (2015.01); *H04N 9/3144* (2013.01)

(58) Field of Classification Search
CPC ......... H04N 9/3144; H04N 9/31–3197; G03B 21/16; G03B 21/204; G03B 21/00–64; F21V 29/673; F21V 29/767
See application file for complete search history.

(56) References Cited

U.S. PATENT DOCUMENTS 9,335,616 B2  5/2016  Lin et al.
2005/0178529 A1  8/2005  Suzuki
(Continued)

FOREIGN PATENT DOCUMENTS

CN  101324746  12/2008
CN  101419386  4/2009
(Continued)

OTHER PUBLICATIONS

Office Action of China Counterpart Application, issued on Feb. 22, 2022, pp. 1-10.
(Continued)

*Primary Examiner* — Bao-Luan Q Le
*Assistant Examiner* — Christopher A Lamb, II
(74) *Attorney, Agent, or Firm* — JCIPRNET

(57) ABSTRACT

A heat dissipation module adapted to dissipate the heat of a wavelength conversion device located inside a closed housing is provided. The heat dissipation module includes a first heat exchange element, a first cooling element, a second heat exchange element and a first heat conductive structure. The first heat exchange element is disposed inside the closed housing. The first cooling element has a cold side and a hot side opposite each other. The first cooling element is disposed inside the closed housing, and the cold side is located between the hot side and the first heat exchange element. The second heat exchange element is disposed outside the closed housing. One end of the first heat conductive structure is connected to the hot side of the first cooling element, and the other end of the first heat conductive structure is connected to the second heat exchange element.

40 Claims, 8 Drawing Sheets

(51) Int. Cl.
*F21V 29/76* (2015.01)
*H04N 9/31* (2006.01)

(56) References Cited

U.S. PATENT DOCUMENTS

| | | | |
|---|---|---|---|
| 2015/0029472 A1 | 1/2015 | Lin et al. | |
| 2015/0085260 A1 | 3/2015 | Hu et al. | |
| 2015/0092164 A1* | 4/2015 | Lin ............... | G03B 21/204 |
| | | | 353/57 |
| 2016/0077326 A1* | 3/2016 | Yamagishi ........ | G02B 26/008 |
| | | | 353/61 |
| 2018/0011392 A1 | 1/2018 | Utsunomiya | |
| 2019/0094671 A1* | 3/2019 | Ikeo ............... | G02B 26/008 |

FOREIGN PATENT DOCUMENTS

| | | |
|---|---|---|
| CN | 101986195 | 3/2011 |
| CN | 203365896 | 12/2013 |
| CN | 104516178 | 4/2015 |
| CN | 106054508 | 10/2016 |
| CN | 106200223 | 12/2016 |
| CN | 106597784 | 4/2017 |
| CN | 107329355 | 11/2017 |
| CN | 107505804 | 12/2017 |
| CN | 107678233 | 2/2018 |
| CN | 206975388 | 2/2018 |
| CN | 207851491 | 9/2018 |
| CN | 209373335 | 9/2019 |
| TW | I594061 | 8/2017 |

OTHER PUBLICATIONS

"Office Action of China Counterpart Application", issued on Aug. 2, 2022, p. 1-p. 14.

Office Action of China Counterpart Application, issued on Mar. 29, 2021, pp. 1-12.

* cited by examiner

HEAT DISSIPATION MODULE AND PROJECTION DEVICE

CROSS-REFERENCE TO RELATED APPLICATION

This application claims the priority benefit of China application serial no. 201910061935.3, filed on Jan. 23, 2019. The entirety of the above-mentioned patent application is hereby incorporated by reference herein and made a part of this specification.

BACKGROUND

Technical Field

The disclosure relates to a heat dissipation device and an optical device, and more particularly to a heat dissipation module and a projection device.

Related Art

A projection device is a display device for generating a large-size image. An imaging principle of the projection device is as follows. An illumination beam generated by a light source is converted into an image beam by a light valve, and the image beam is then projected onto a screen or a wall surface by a lens. However, in current projection devices, a wavelength conversion device for converting beams, such as a phosphor wheel, is susceptible to dust, thereby resulting in reduced optical efficiency and affecting system brightness and service life.

In order to achieve a dustproof effect, the wavelength conversion device may be enclosed by a closed chamber. However, the temperature of the wavelength conversion device may be raised, thus affecting its service life. In a current approach, a fan is placed in the closed chamber for internal flow field cooling. However, in practice, in such an approach, air temperature in the closed chamber is still too high, which still affects the temperature of optical elements in the closed chamber. Also, an operating environment temperature of the fan needs to be considered. Therefore, persons skilled in the art are striving to design a good heat dissipation module to perform heat dissipation on a wavelength conversion wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a heat dissipation module and a projection device capable of effectively performing heat dissipation on a wavelength conversion device.

Other objectives and advantages of the disclosure are further illustrated by the technical features disclosed in the disclosure.

To achieve one of, some of or all of the above objectives or other objectives, an embodiment of the disclosure proposes a heat dissipation module for performing heat dissipation on a wavelength conversion device located inside a closed housing. The heat dissipation module includes a first heat exchange element, a first cooling element, a second heat exchange element and a first heat conductive structure. The first heat exchange element is disposed inside the closed housing. The first cooling element has a cold side and a hot side opposite each other. The first cooling element is disposed inside the closed housing, and the cold side of the first cooling element is located between the hot side of the first cooling element and the first heat exchange element. The second heat exchange element is disposed outside the closed housing. One end of the first heat conductive structure is connected to the hot side of the first cooling element, and the other end of the first heat conductive structure is connected to the second heat exchange element.

To achieve one of, some of or all of the above objectives or other objectives, another embodiment of the disclosure proposes a projection device including a closed housing, a wavelength conversion device and a heat dissipation module. The wavelength conversion device is located inside the closed housing and has a first surface and a second surface opposite each other. The wavelength conversion device rotates about a central axis, and the first surface is configured to receive an excitation beam. The heat dissipation module is configured to perform heat dissipation on the wavelength conversion device. The heat dissipation module includes a first heat exchange element, a first cooling element, a second heat exchange element and a first heat conductive structure. The first heat exchange element is disposed inside the closed housing. The first cooling element has a cold side and a hot side opposite each other. The first cooling element is disposed inside the closed housing, and the cold side of the first cooling element is located between the hot side of the first cooling element and the first heat exchange element. The second heat exchange element is disposed outside the closed housing. One end of the first heat conductive structure is connected to the hot side of the first cooling element, and the other end of the first heat conductive structure is connected to the second heat exchange element.

Based on the above, the embodiments of the disclosure at least have one of the following advantages or effects. In the projection device of the disclosure, heat emitted by the wavelength conversion device inside the closed housing can be transferred outside the closed housing via the first heat exchange element of the heat dissipation module, the first cooling element connected to the first heat exchange element, the first heat conductive structure connected to the first cooling element, and the second heat exchange element connected to the first heat conductive structure in sequence, thereby achieving the heat dissipation effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
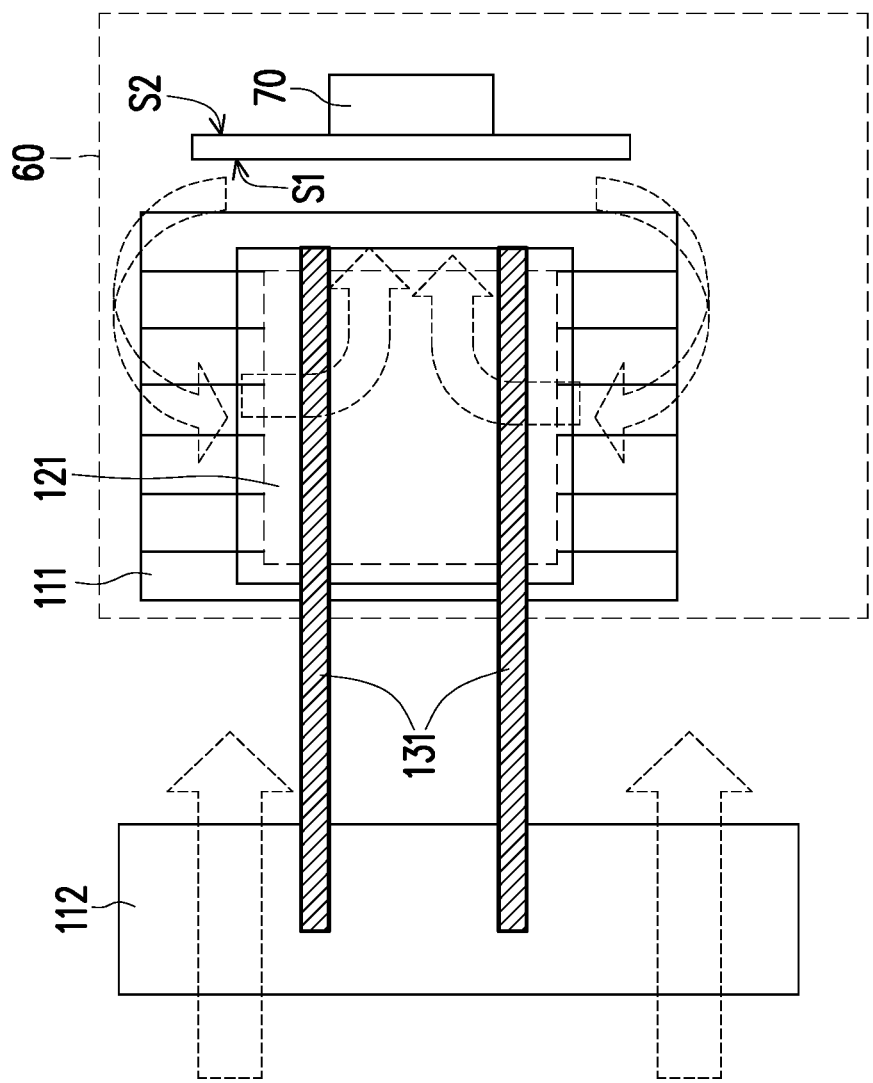
FIG. 1 is a schematic view of a heat dissipation module for a projection device according to an embodiment of the disclosure.

FIG. 1 is a schematic view of a heat dissipation module for a projection device according to an embodiment of the disclosure. Referring to FIG. 1, in the present embodiment, a projection device 50 includes a closed housing 60, a wavelength conversion device 70 and a heat dissipation module 100. For ease of description, FIG. 1 only shows a portion of the projection device 50 and shows the closed housing 60 in a perspective manner to display the components inside it. The projection device 50 of the present embodiment is configured to project an image screen to a projection target. Specifically, the projection device 50 may further include an architecture such as an illumination system, an optomechanical module or the like, the illumination system includes a light source to enable the illumination system to provide an illumination beam to the optomechanical module, the optomechanical module includes at least one light valve to convert the illumination beam into an image beam with image information, and the image beam is finally converted by a projection lens into a projection beam to be projected to the projection target such as a screen, a wall surface or the like.

Figure 2A:
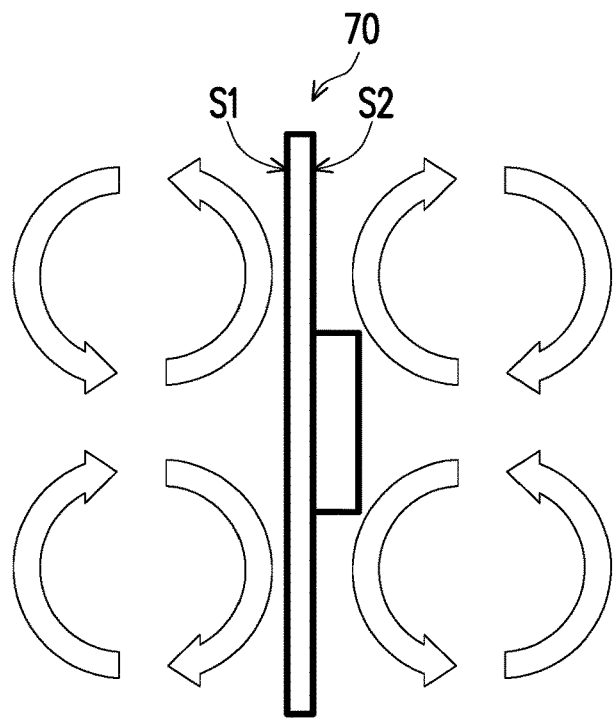
FIG. 2A and FIG. 2B are respectively schematic views of airflow on a lateral side and a front side of a wavelength conversion device.
Figure 2B:
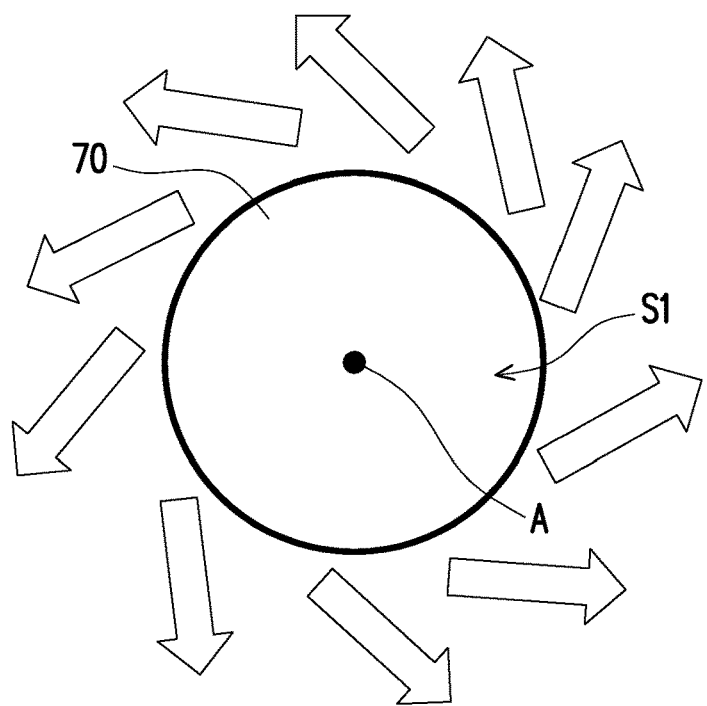

FIG. 2A and FIG. 2B are respectively schematic views of airflow on a lateral side and a front side of a wavelength conversion device. The wavelength conversion device 70 is located inside the closed housing 60 of the projection device 50 and is disposed on a transmission path of an excitation beam (not shown) provided by the light source in the illumination system. In the present embodiment, the wavelength conversion device 70 may be a phosphor wheel capable of rotating about a central axis A. The wavelength conversion device 70 has a first surface S1 and a second surface S2 opposite each other, and the first surface S1 includes a wavelength conversion material (e.g., a phosphor material) and receives the excitation beam to convert it into a stimulated beam having a different wavelength from the excitation beam. The wavelength conversion device 70 is, for example, a phosphor wheel, and is a device capable of converting, for example, a blue excitation beam, into a conversion beam of another color. The disclosure is not limited thereto. In some embodiments, when the wavelength conversion device 70 is rotating about the central axis A, at a center position of the wavelength conversion device 70, air is sucked to the first surface S1 of the wavelength conversion device 70 and is sent out at an edge position along a radial direction of the wavelength conversion device 70. Therefore, heat generated by the wavelength conversion device 70 by receiving the excitation beam can be discharged by this airflow, as shown in FIG. 2A. In addition, when the wavelength conversion device 70 is rotating about the central axis A, around the wavelength conversion device 70, air can be discharged along a tangential direction of an edge (i.e., a side edge of the wavelength conversion device 70) by the rotation of the wavelength conversion device 70, as shown in FIG. 2B.

Referring still to FIG. 1, a heat dissipation module 100 is configured to perform heat dissipation on the wavelength conversion device 70 located inside the closed housing 60. In the present embodiment, the heat dissipation module 100 includes a first heat exchange element 111, a first cooling element 121, a second heat exchange element 112 and a first heat conductive structure 131, the first heat exchange element 111 and the first cooling element 121 are disposed inside the closed housing 60, and the second heat exchange element 112 and the first heat conductive structure 131 are disposed outside the closed housing 60.

In the present embodiment, the first heat exchange element 111 is, for example, a heat conductive structure including a plurality of heat sink fins disposed inside the closed housing 60 and located on a side of the wavelength conversion device 70 adjacent to the first surface S1. The first heat exchange element 111 absorbs the heat sent out at the edge position of the wavelength conversion device 70 and conducts the heat to other elements, as indicated by arrows shown in FIG. 1. In the present embodiment, the heat sink fins of the first heat exchange element 111 are arranged parallel to the first surface S1 of the wavelength conversion device 70. However, in other embodiments, the first heat exchange element 111 may have heat sink fins arranged in different directions. For example, the heat sink fins of the first heat exchange element 111 may be disposed perpendicular to the first surface S1 of the wavelength conversion device 70. Nonetheless, the disclosure is not limited thereto. In some embodiments, the heat conductive structure including a plurality of heat sink fins may be made of a highly thermally conductive, lightweight, and highly processable metal (e.g., aluminum or copper), and is attached to a heating surface to realize heat exchange.

The first cooling element 121 is disposed inside the closed housing 60 and has a cold side and a hot side (e.g., a cold side SC and a hot side SH in FIG. 3B) opposite each other, and the cold side is located between the hot side and the first heat exchange element 111. In detail, in the present embodiment, the first cooling element 121 is, for example, a semiconductor cooling chip whose cold side contacts the first heat exchange element 111. In this configuration, the first heat exchange element 111 provides cold air having a lower temperature at the first surface S1 of the wavelength conversion device 70, as indicated by the arrows shown in FIG. 1, so as to lower the temperature of the wavelength conversion device 70. In other embodiments, the first cooling element 121 may be a Peltier effect-based heat dissipation device. For example, the first cooling element 121 may be obtained as follows. A plurality of pairs of N-type and P-type semiconductor dies are connected to each other and arranged in series, N-type and P-type semiconductor dies are connected by common copper, aluminum or other metal conductor to form a complete circuit, and are packaged by being sandwiched between ceramic sheets in outer layers on both sides. When powered, the P-type semiconductor absorbs heat and the N-type semiconductor releases heat. Therefore, in each N/P module, heat is transferred from one side ("heat absorbing end") to the other side ("heat releasing end") to complete heat transfer for cooling.

The second heat exchange element 112 is, for example, a heat conductive structure including a plurality of heat sink fins, and is disposed outside the closed housing 60 and connected to the first cooling element 121. In the present embodiment, a direction of the heat sink fins of the second heat exchange element 112 is perpendicular to the first surface S1 of the wavelength conversion device 70, so as to facilitate the ambient temperature air to flow from a side of the second heat exchange element 112 facing the closed housing 60 to the closed housing 60. However, in other embodiments, the heat sink fins of the second heat exchange element 112 may be disposed in a direction parallel to the first surface S1 of the wavelength conversion device 70 according to the configuration of the other elements of the projection device 50 and airflow direction requirements. However, the disclosure is not limited thereto. In other embodiments, the first heat exchange element 111 or the second heat exchange element 112 may include heat sink fins arranged parallel to the first surface S1 of the wavelength conversion device 70 and heat sink fins disposed perpendicular to the first surface S1 of the wavelength conversion device 70. According to other embodiments of the disclosure, the first heat exchange element 111 or the second heat exchange element 112 may include a columnar heat dissipation structure such as a cylindrical heat dissipation column.

The first heat conductive structure 131 has two opposite ends. In detail, the first heat conductive structure 131 is, for example, a heat pipe or other heat dissipation structure made of a heat conductive material. One end of the first heat conductive structure 131 is connected to the hot side of the first cooling element 121, and the other end of the first heat conductive structure 131 is connected to the second heat exchange element 112. More specifically, one end of the first heat conductive structure 131 is attached to the hot side of the first cooling element 121. In some embodiments, the heat pipe may be made of a highly thermally conductive material which may have characteristics such as light weight, rapid temperature uniformity and so on. For example, the heat pipe may be a copper pipe, an aluminum pipe or a titanium pipe.

In the present embodiment, the first heat exchange element 111 cools the wavelength conversion device 70 by a low temperature generated by the cold side of the first cooling element 121, and heat generated by the hot side of the first cooling element 121 is transferred outside the closed housing 60 by the first heat conductive structure 131. Therefore, when the heat dissipation module 100 performs heat dissipation, the temperature of the first heat exchange element 111 is lower than or equal to the temperature of the second heat exchange element 112. In this way, heat emitted by the wavelength conversion device 70 inside the closed housing 60 can be transferred outside the closed housing 60 via the first heat exchange element 111 of the heat dissipation module 100, the first cooling element 121 connected to the first heat exchange element 111, the first heat conductive structure 131 connected to the first cooling element 121, and the second heat exchange element 112 connected to the first heat conductive structure 131 in sequence, thereby achieving the heat dissipation effect.

Figure 3A:
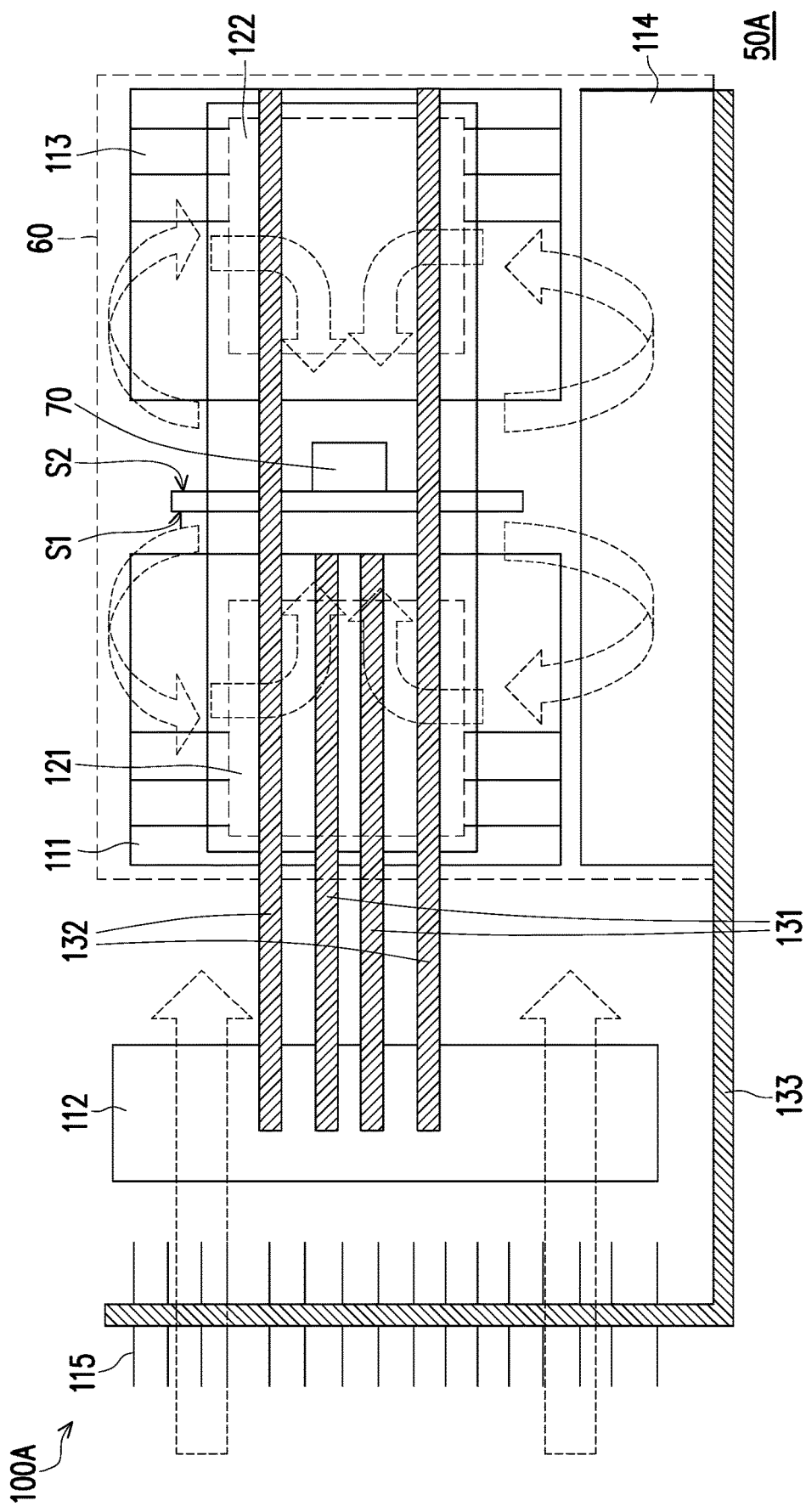
FIG. 3A and FIG. 3B are respectively a schematic top view and a schematic side view of a heat dissipation module for a projection device according to another embodiment of the disclosure.
Figure 3B:
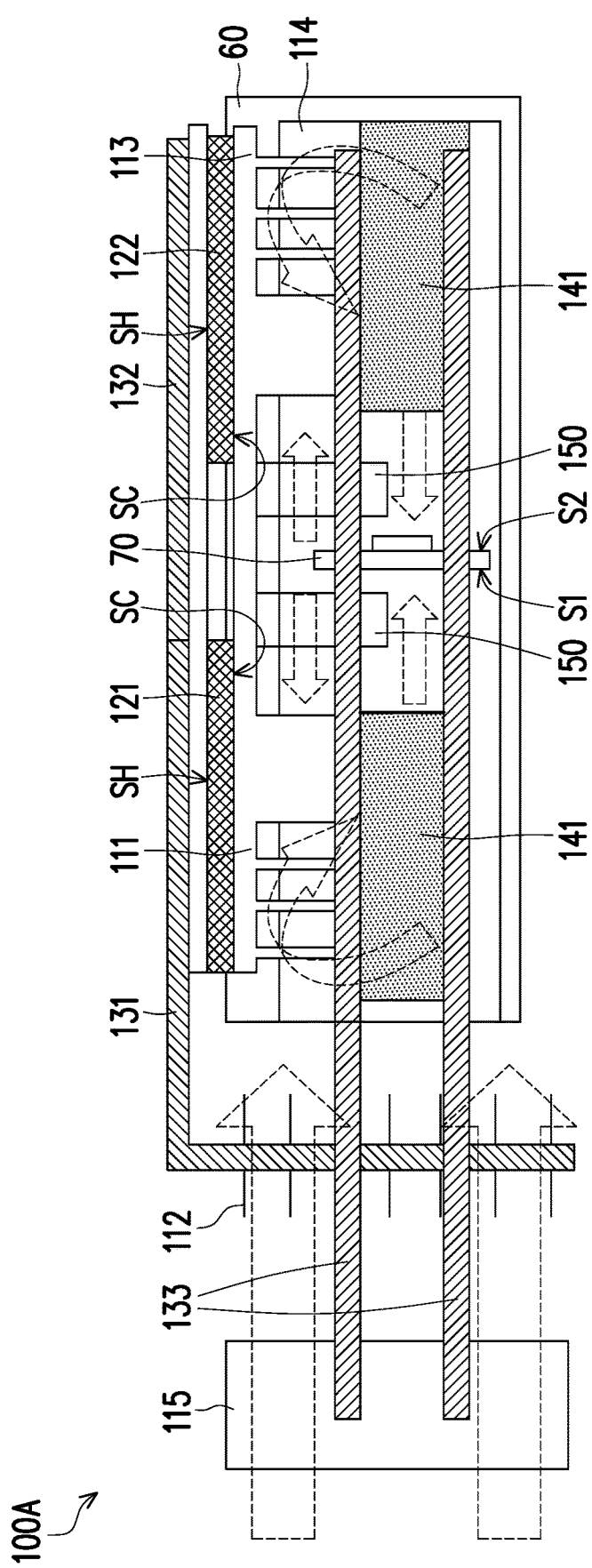

FIG. 3A and FIG. 3B are respectively a schematic top view and a schematic side view of a heat dissipation module for a projection device according to another embodiment of the disclosure. Referring to FIG. 3A and FIG. 3B, a projection device 50A of the present embodiment is similar to the projection device 50 of FIG. 1. A difference between them lies in that, in the present embodiment, a heat dissipation module 100A of the projection device 50A further includes a third heat exchange element 113, a second cooling element 122 and a second heat conductive structure 132. The third heat exchange element 113 is similar to the first heat exchange element 111, the second cooling element 122 is similar to the first cooling element 121, and the second heat conductive structure 132 is similar to the first heat conductive structure 131.

In detail, the third heat exchange element 113 is disposed inside the closed housing 60, and the second surface S2 of the wavelength conversion device 70 is located between the first surface S1 and the third heat exchange element 113. In other words, the first heat exchange element 111 and the third heat exchange element 113 are respectively disposed on two opposite sides of the wavelength conversion device 70. The second cooling element 122 is disposed inside the closed housing 60 and has the cold side SC and the hot side SH (shown in FIG. 3B) opposite each other. The cold side SC of the second cooling element 122 is located between the hot side SH of the second cooling element 122 and the third heat exchange element 113. The second heat conductive structure 132 has two opposite ends, one end is connected to the hot side SH of the second cooling element 122, and the other end is connected to the second heat exchange element 112. In other words, the first heat exchange element 111 and the third heat exchange element 113 transfer heat to the second heat exchange element 112 respectively via the first heat conductive structure 131 and the second heat conductive structure 132, thereby performing heat dissipation. In this way, the heat dissipation effect of the heat dissipation module 100A can further be improved. In the present embodiment, at least one of the first heat conductive structure 131 and the second heat conductive structure 132 may be formed integrally with the closed housing 60.

It is worth mentioning that, in the present embodiment, the heat dissipation module 100A further includes at least one first fan 141 (shown in FIG. 3B) disposed inside the closed housing 60 and for blowing the air cooled by the cold side SC of each of the first cooling element 121 and the second cooling element 122 to the wavelength conversion device 70. In addition, in the present embodiment, at least one of the first heat exchange element 111 and the third heat exchange element 113 includes a plurality of heat sink fins, and some of these heat sink fins are arranged parallel to the first surface S1 of the wavelength conversion device 70. Specifically, in the present embodiment, the heat dissipation module 100A is provided with two first fans 141 corresponding to the first heat exchange element 111 and the third heat exchange element 113, respectively. The first heat exchange element 111 and the third heat exchange element 113 each includes two groups of heat sink fins, and one group of the heat sink fins away from the wavelength conversion device 70 are arranged in the direction parallel to the first surface S1 of the wavelength conversion device 70. The other group of the heat sink fins adjacent to the wavelength conversion device 70 are arranged in the direction perpendicular to the first surface S1 of the wavelength conversion device 70.

In the heat dissipation module 100A of the present embodiment, the cold side SC of each of the first cooling element 121 and the second cooling element 122 lowers the temperatures of the first heat exchange element 111 and the third heat exchange element 113, respectively, such that the air around the first heat exchange element 111 and the third heat exchange element 113 has a low temperature. The first fan 141 corresponding to each of the first heat exchange element 111 and the third heat exchange element 113 blows the air cooled by the first cooling element 121 and the second cooling element 122 in a direction to the center of the wavelength conversion device 70 to cool the wavelength conversion device 70. In the present embodiment, the heat dissipation module 100A may further include at least one stopper 150 (shown in FIG. 3B) located between the first heat exchange element 111 and the wavelength conversion device 70 and between the second heat exchange element 112 and the wavelength conversion device 70, for transmitting the air blown by each first fan 141 from the center of the wavelength conversion device 70 to the side edge of the wavelength conversion device 70. In addition, the heat generated by the wavelength conversion device 70 is transferred to the second heat exchange element 112 via the first heat exchange element 111 and the third heat exchange element 113 for heat dissipation.

In the above embodiment, by designing the arrangement direction of the heat sink fins in the first heat exchange element 111 and the third heat exchange element 113 and configuring the first fan 141 (e.g., configuring the size, number, and/or position thereof), the heat dissipation effect of the heat dissipation module 100A can further be improved. However, in some embodiments, a good heat dissipation effect can also be achieved by either of the above means, i.e., by configuring the fan or by designing the arrangement direction of the heat sink fins, and the disclosure is not limited thereto. In addition, in some embodiments, the heat dissipation structure of at least one of the first heat exchange element 111 and the third heat exchange element 113 may be designed as a plurality of heat dissipation columns instead of heat sink fins so as to increase smoothness of the airflow. However, the disclosure is not limited thereto.

In addition, in the present embodiment, the heat dissipation module 100A further includes a fourth heat exchange element 114, a fifth heat exchange element 115 and a third heat conductive structure 133. In terms of structure, the fourth heat exchange element 114 is similar to the first heat exchange element 111, the fifth heat exchange element 115 is similar to the second heat exchange element 112, and the third heat conductive structure 133 is similar to the first heat conductive structure 131.

Specifically, the fourth heat exchange element 114 is disposed inside the closed housing 60 and located on the side edge of the wavelength conversion device 70 (i.e., on a transmission path of the airflow as shown in FIG. 2B). The fifth heat exchange element 115 is disposed outside the closed housing 60. The third heat conductive structure 133 has two opposite ends, one end is connected to the fourth heat exchange element 114, and the other end is connected to the fifth heat exchange element 115. In the present embodiment, the heat generated by the wavelength conversion device 70 can also be transferred to the fifth heat exchange element 115 via the fourth heat exchange element 114 for heat dissipation. Therefore, when the heat dissipation module 100A performs heat dissipation, the temperature of the fourth heat exchange element 114 may be higher than the temperature of the fifth heat exchange element 115.

In some embodiments, the fourth heat exchange element 114 includes a plurality of heat sink fins, and at least some of these heat sink fins are arranged perpendicular to the first surface S1 of the wavelength conversion device 70. In some embodiments, the fourth heat exchange element 114 may be designed to surround at least a portion of the side edge of the wavelength conversion device 70, or to surround the entire side edge of the wavelength conversion device 70. Nonetheless, the disclosure is not limited thereto.

It is worth mentioning that, a distance between the fifth heat exchange element 115 and the closed housing 60 is greater than a distance between the second heat exchange element 112 and the closed housing 60, and the second heat exchange element 112 is located between the fifth heat exchange element 115 and the closed housing 60. In this configuration, the temperature of the fifth heat exchange element 115 may be lower than the temperature of the second heat exchange element 112. In the present embodiment, an improved heat dissipation effect can be achieved by causing the air outside the closed housing 60 to flow from the fifth heat exchange element 115 to the second heat exchange element 112.

Figure 4:
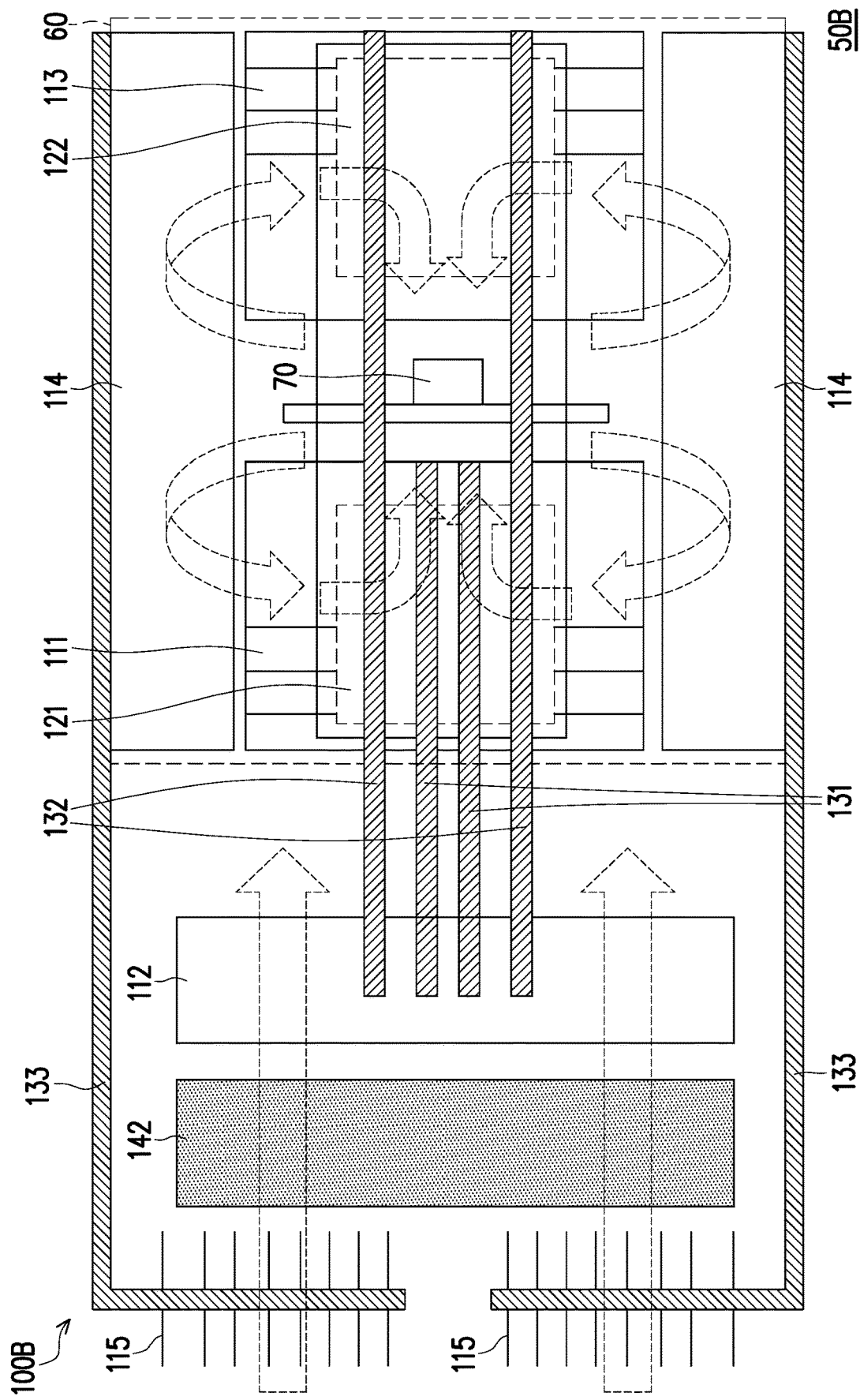
FIG. 4 is a schematic view of a heat dissipation module for a projection device according to another embodiment of the disclosure.

FIG. 4 is a schematic view of a heat dissipation module for a projection device according to another embodiment of the disclosure. Referring to FIG. 4, a projection device 50B of the present embodiment is similar to the projection device 50A of FIG. 3A. A difference between them lies in that, in the present embodiment, the fourth heat exchange element 114 of a heat dissipation module 100B of the projection device 50B includes at least two portions, and these two portions are respectively located at two opposite side edges of the wavelength conversion device 70. In other words, in the present embodiment, two fourth heat exchange elements 114, two third heat conductive structures 133, and two fifth heat exchange elements 115 are disposed. Therefore, heat dissipation efficiency can further be increased.

In addition, in an embodiment of the disclosure, the heat dissipation module 100B further includes at least one second fan 142 disposed outside the closed housing 60 and located between the fifth heat exchange element 115 and the second heat exchange element 112. The second fan 142 is configured to blow the air from the fifth heat exchange element 115 having a lower temperature to the second heat exchange element 112 having a higher temperature. In this way, in the case where the temperature of the fifth heat exchange element 115 is lower than the temperature of the second heat exchange element 112, the heat exchange effect between the fifth heat exchange element 115 and the second heat exchange element 112 can be improved, thereby facilitating heat dissipation of the projection device 50B.

Figure 5:
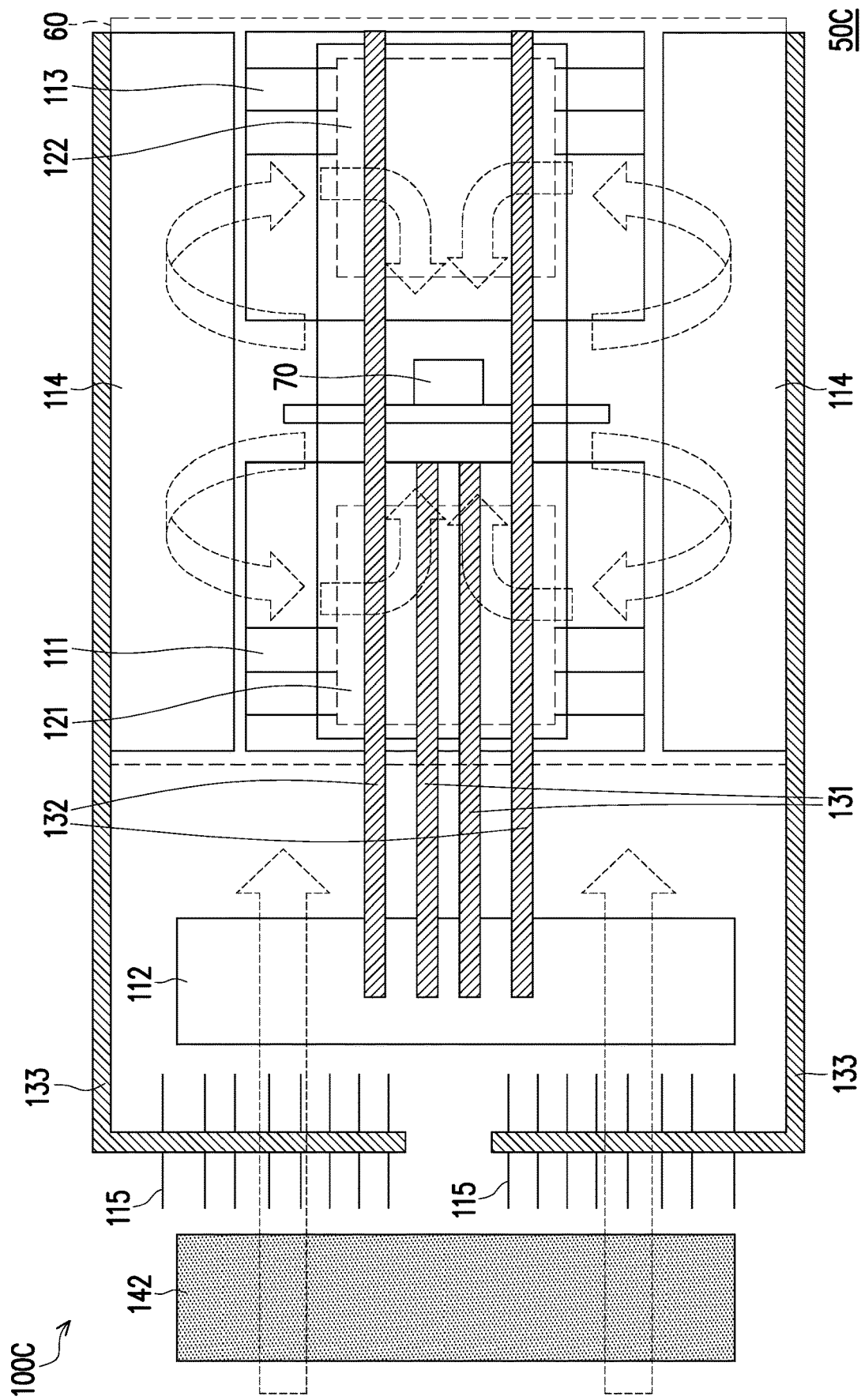
FIG. 5 is a schematic view of a heat dissipation module for a projection device according to another embodiment of the disclosure.

FIG. 5 is a schematic view of a heat dissipation module for a projection device according to another embodiment of the disclosure. Referring to FIG. 5, a projection device 50C of the present embodiment is similar to the projection device 50B of FIG. 4. A difference between them lies in that, in the present embodiment, the second fan 142 of a heat dissipation module 100C of the projection device 50C is disposed outside the closed housing 60, and the fifth heat exchange element 115 is located between the second fan 142 and the second heat exchange element 112, i.e., the second fan 142 is located on a side of the fifth heat exchange element 115 away from the closed housing 60. The second fan 142 is configured to blow the air from the fifth heat exchange element 115 having a lower temperature to the second heat exchange element 112 having a higher temperature. In this way, in the case where the temperature of the fifth heat exchange element 115 is lower than the temperature of the second heat exchange element 112, the heat exchange effect between the fifth heat exchange element 115 and the second heat exchange element 112 can be improved, thereby facilitating heat dissipation of the projection device 50C.

Figure 6:
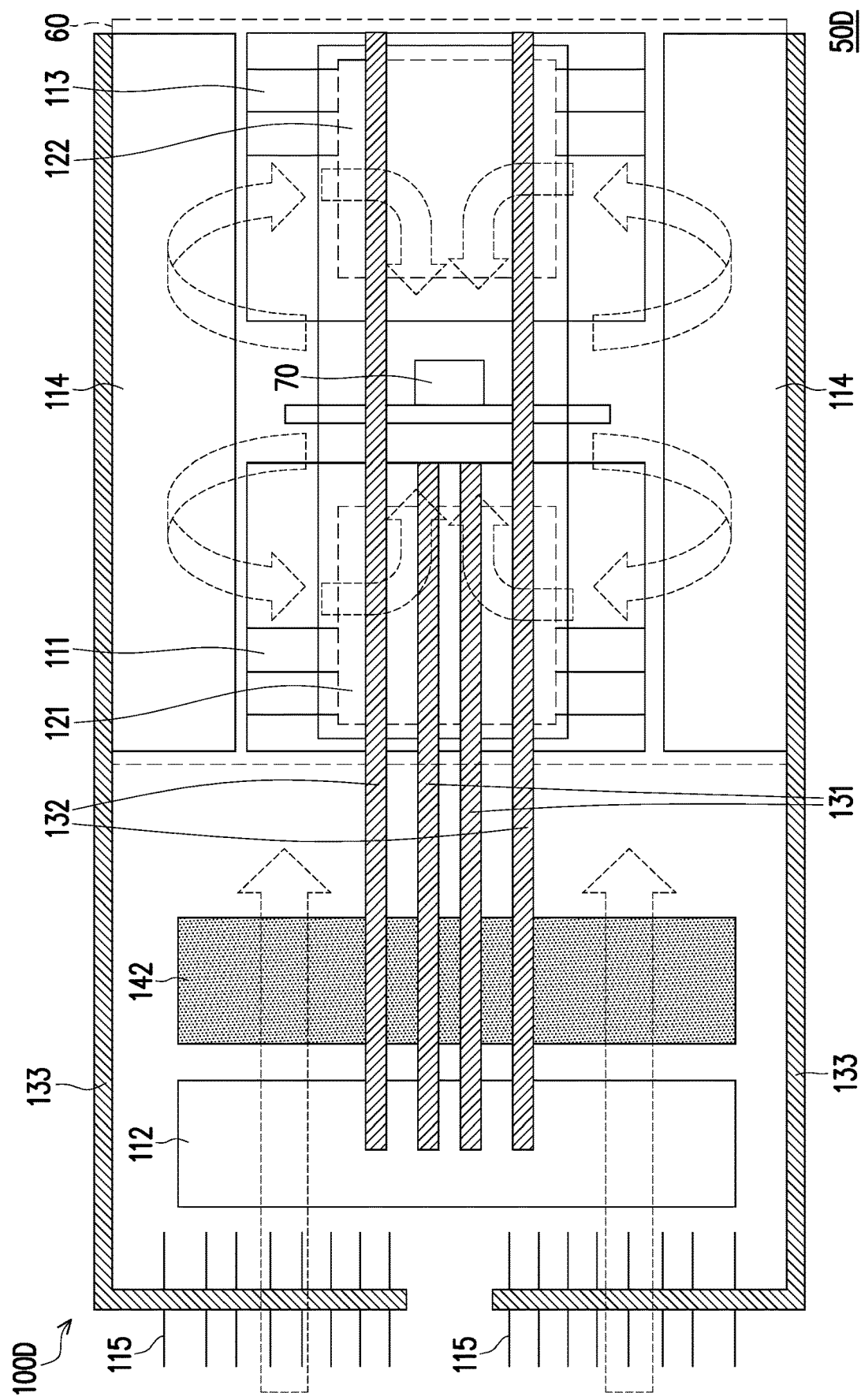
FIG. 6 is a schematic view of a heat dissipation module for a projection device according to another embodiment of the disclosure.

FIG. 6 is a schematic view of a heat dissipation module for a projection device according to another embodiment of the disclosure. Referring to FIG. 6, a projection device 50D of the present embodiment is similar to the projection device 50B of FIG. 4. A difference between them lies in that, in the present embodiment, the second fan 142 of a heat dissipation module 100D of the projection device 50D is disposed outside the closed housing 60, and the second fan 142 is located between the second heat exchange element 112 and the closed housing 60. The second fan 142 is configured to extract air from outside the projection device 50D by pumping, so that the outside air having a lower temperature is transferred from the fifth heat exchange element 115 to the second heat exchange element 112 and passes through the fifth heat exchange element 115 and the second heat exchange element 112 in sequence, as shown in FIG. 6. In this way, in the case where the temperature of the fifth heat exchange element 115 is lower than the temperature of the second heat exchange element 112, the heat exchange effect between the fifth heat exchange element 115 and the second heat exchange element 112 can be improved.

Figure 7:
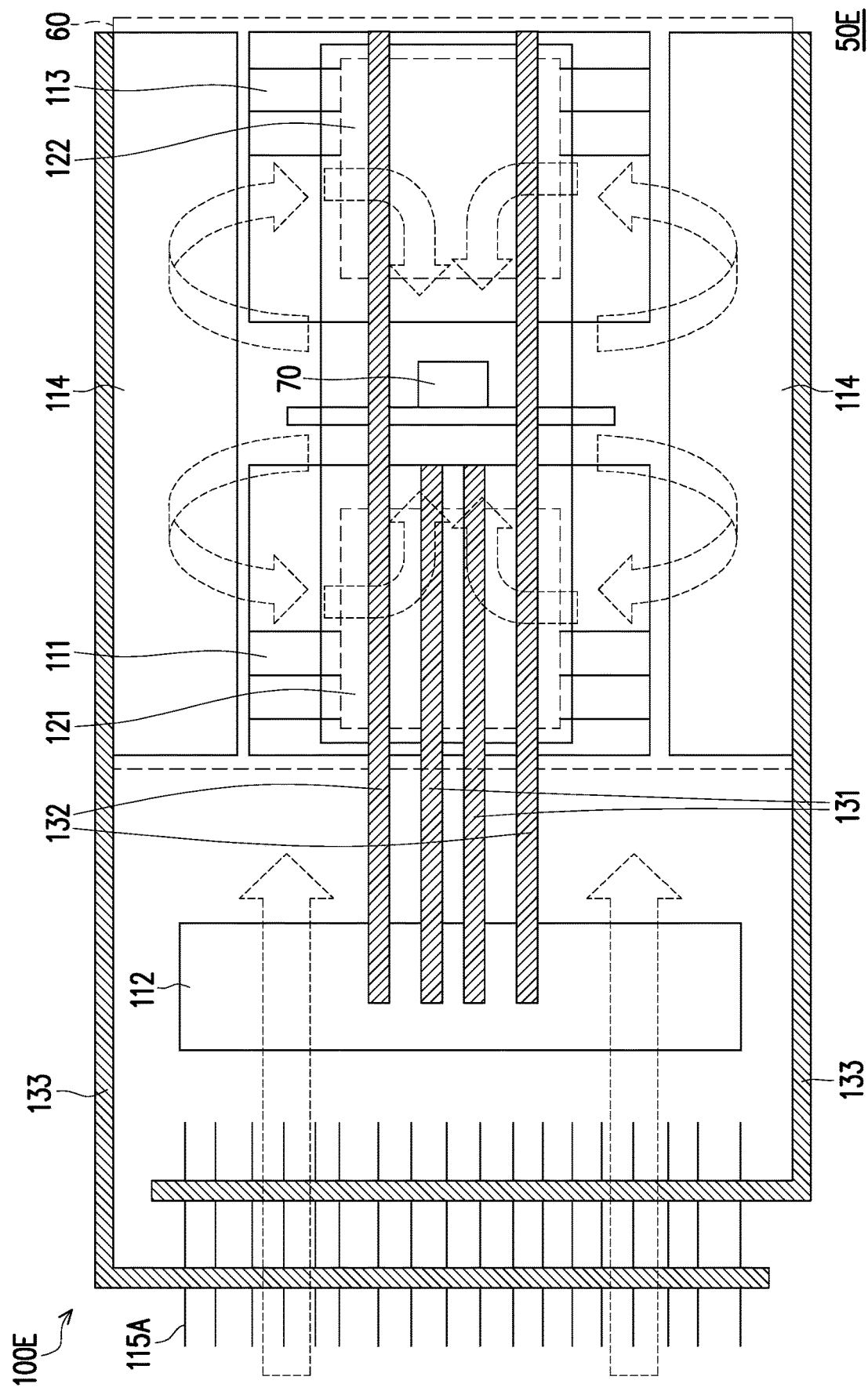
FIG. 7 is a schematic view of a heat dissipation module for a projection device according to another embodiment of the disclosure.

FIG. 7 is a schematic view of a heat dissipation module for a projection device according to another embodiment of the disclosure. Referring to FIG. 7, a projection device 50E of the present embodiment is similar to the projection device 50B of FIG. 4. A difference between them lies in that, in the present embodiment, only one fifth heat exchange element 115A is disposed. Specifically, the two third heat conductive structures 133 for transferring the heat transferred by the two fourth heat exchange elements 114 are commonly connected to the fifth heat exchange element 115A. Therefore, material can further be saved, and a temperature difference between the fifth heat exchange element 115A and the second heat exchange element 112 can be adjusted.

In some embodiments, a third cooling element (not shown) may further be disposed between the third heat conductive structure 133 and the fourth heat exchange element 114 to increase heat dissipation efficiency. However, the disclosure is not limited thereto.

In summary, the embodiments of the disclosure at least have one of the following advantages or effects. In the projection device of the disclosure, the heat emitted by the wavelength conversion device inside the closed housing can be transferred outside the closed housing via the first heat exchange element of the heat dissipation module, the first cooling element connected to the first heat exchange element, the first heat conductive structure connected to the first cooling element, and the second heat exchange element connected to the first heat conductive structure in sequence, thereby achieving the heat dissipation effect.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A heat dissipation module for performing heat dissipation on a wavelength conversion device located inside a closed housing, wherein the heat dissipation module comprises a first heat exchange element, a first cooling element, a second heat exchange element and a first heat conductive structure, wherein:
- the first heat exchange element is disposed inside the closed housing;
- the first cooling element has a cold side and a hot side opposite each other, the first cooling element is entirely disposed inside the closed housing and the cold side of the first cooling element is located between the hot side of the first cooling element and the first heat exchange element;
- the second heat exchange element is disposed outside the closed housing; and
- one end of the first heat conductive structure is connected to the hot side of the first cooling element, and the other end of the first heat conductive structure is connected to the second heat exchange element;
- wherein the cold side of the first cooling element directly contacts the first heat exchange element.

2. The heat dissipation module according to claim 1, wherein the one end of the first heat conductive structure is attached to the hot side of the first cooling element.

3. The heat dissipation module according to claim 1, wherein the first heat exchange element cools the wavelength conversion device by a low temperature generated by the cold side of the first cooling element, and heat generated by the hot side of the first cooling element is transferred outside the closed housing by the first heat conductive structure.

4. The heat dissipation module according to claim 1, wherein a temperature of the first heat exchange element is lower than or equal to a temperature of the second heat exchange element.

5. The heat dissipation module according to claim 1, wherein the first heat conductive structure is formed integrally with the closed housing.

6. The heat dissipation module according to claim 1, further comprising:
- at least one first fan, disposed inside the closed housing and configured to blow air cooled by the cold side of the first cooling element to the wavelength conversion device.

7. The heat dissipation module according to claim 6, further comprising:
- at least one stopper, located between the first heat exchange element and the wavelength conversion device, wherein the at least one stopper is configured to transfer the air blown by the at least one first fan from a center of the wavelength conversion device to a side edge of the wavelength conversion device.

8. A heat dissipation module for performing heat dissipation on a wavelength conversion device located inside a closed housing, wherein the wavelength conversion device rotates about a central axis and has a first surface and a second surface opposite each other, and the first surface is configured to receive an excitation beam, wherein the heat dissipation module comprises a first heat exchange element, a first cooling element, a second heat exchange element and a first heat conductive structure, wherein:
- the first heat exchange element is disposed inside the closed housing, wherein the first surface is located between the first heat exchange element and the second surface;
- the first cooling element has a cold side and a hot side opposite each other, the first cooling element is entirely disposed inside the closed housing and the cold side of the first cooling element is located between the hot side of the first cooling element and the first heat exchange element;
- the second heat exchange element is disposed outside the closed housing; and
- one end of the first heat conductive structure is connected to the hot side of the first cooling element, and the other end of the first heat conductive structure is directly connected to the second heat exchange element,
- wherein the cold side of the first cooling element thermally contacts the first heat exchange element.

9. The heat dissipation module according to claim 8, further comprising:
- a third heat exchange element, disposed inside the closed housing, wherein the second surface is located between the first surface and the third heat exchange element;
- a second cooling element, having a cold side and a hot side opposite each other, wherein the second cooling element is disposed inside the closed housing, and the cold side of the second cooling element is located between the hot side of the second cooling element and the third heat exchange element; and
- a second heat conductive structure, wherein one end of the second heat conductive structure is connected to the hot side of the second cooling element, and the other end of the second heat conductive structure is connected to the second heat exchange element.

10. The heat dissipation module according to claim 9, wherein at least one of the first heat exchange element and the third heat exchange element comprises a plurality of heat sink fins, and some of the plurality of heat sink fins are arranged parallel to the first surface of the wavelength conversion device.

11. The heat dissipation module according to claim 10, wherein others of the plurality of heat sink fins are arranged perpendicular to the first surface of the wavelength conversion device.

12. The heat dissipation module according to claim 9, wherein at least one of the first heat exchange element and the third heat exchange element comprises a plurality of heat dissipation columns.

13. The heat dissipation module according to claim 9, wherein the second heat conductive structure is formed integrally with the closed housing.

14. The heat dissipation module according to claim 9, further comprising:
- a fourth heat exchange element, disposed inside the closed housing and located at a side edge of the wavelength conversion device;
- a fifth heat exchange element, disposed outside the closed housing; and
- a third heat conductive structure, wherein one end of the third heat conductive structure is connected to the fourth heat exchange element, the other end of the third heat conductive structure is connected to the fifth heat exchange element, heat generated by the wavelength conversion device is transferred to the fifth heat exchange element by the fourth heat exchange element, a temperature of the fourth heat exchange element is higher than a temperature of the fifth heat exchange element, and the temperature of the fifth heat exchange element is lower than a temperature of the second heat exchange element.

15. The heat dissipation module according to claim 14, wherein a distance between the fifth heat exchange element and the closed housing is greater than a distance between the second heat exchange element and the closed housing, and the second heat exchange element is located between the fifth heat exchange element and the closed housing.

16. The heat dissipation module according to claim 14, wherein the fourth heat exchange element comprises a plurality of heat sink fins, and some of the plurality of heat sink fins are arranged perpendicular to the first surface of the wavelength conversion device.

17. The heat dissipation module according to claim 14, wherein the fourth heat exchange element surrounds the side edge of the wavelength conversion device.

18. The heat dissipation module according to claim 14, wherein the fourth heat exchange element comprises at least two portions, the at least two portions are respectively located at two opposite side edges of the wavelength conversion device.

19. The heat dissipation module according to claim 14, further comprising:
a third cooling element, connected between the one end of the third heat conductive structure and the fourth heat exchange element.

20. The heat dissipation module according to claim 14, further comprising:
at least one second fan, disposed outside the closed housing, wherein the at least one second fan is located on a side of the fifth heat exchange element away from the closed housing, between the fifth heat exchange element and the second heat exchange element or between the second heat exchange element and the closed housing, and the at least one second fan is configured to blow air from the fifth heat exchange element to the second heat exchange element.

21. A projection device, comprising a closed housing, a wavelength conversion device and a heat dissipation module, wherein:
the wavelength conversion device is located inside the closed housing and has a first surface and a second surface opposite each other, the wavelength conversion device rotates about a central axis, and the first surface is configured to receive an excitation beam; and
the heat dissipation module is configured to perform heat dissipation on the wavelength conversion device, and the heat dissipation module comprises a first heat exchange element, a first cooling element, a second heat exchange element and a first heat conductive structure, wherein:
the first heat exchange element is disposed inside the closed housing;
the first cooling element has a cold side and a hot side opposite each other, the first cooling element is entirely disposed inside the closed housing, and the cold side of the first cooling element is located between the hot side of the first cooling element and the first heat exchange element;
the second heat exchange element is disposed outside the closed housing; and
one end of the first heat conductive structure is connected to the hot side of the first cooling element, and the other end of the first heat conductive structure is connected to the second heat exchange element;
wherein the cold side of the first cooling element directly contacts the first heat exchange element.

22. The projection device according to claim 21, wherein the one end of the first heat conductive structure is attached to the hot side of the first cooling element.

23. The projection device according to claim 21, wherein the first heat exchange element cools the wavelength conversion device by a low temperature generated by the cold side of the first cooling element, and heat generated by the hot side of the first cooling element is transferred outside the closed housing by the first heat conductive structure.

24. The projection device according to claim 21, wherein a temperature of the first heat exchange element is lower than or equal to a temperature of the second heat exchange element.

25. The projection device according to claim 21, wherein the heat dissipation module further comprises a third heat exchange element, a second cooling element and a second heat conductive structure, the third heat exchange element is disposed inside the closed housing, the second surface is located between the first surface and the third heat exchange element, the second cooling element has a cold side and a hot side opposite each other, the second cooling element is disposed inside the closed housing, the cold side of the second cooling element is located between the hot side of the second cooling element and the third heat exchange element, one end of the second heat conductive structure is connected to the hot side of the second cooling element, the other end of the second heat conductive structure is connected to the second heat exchange element.

26. The projection device according to claim 25, wherein at least one of the first heat exchange element and the third heat exchange element comprises a plurality of heat sink fins, some of the plurality of heat sink fins are arranged parallel to the first surface of the wavelength conversion device.

27. The projection device according to claim 26, wherein others of the plurality of heat sink fins are arranged perpendicular to the first surface of the wavelength conversion device.

28. The projection device according to claim 25, wherein at least one of the first heat exchange element and the third heat exchange element comprises a plurality of heat dissipation columns.

29. The projection device according to claim 25, wherein the second heat conductive structure is formed integrally with the closed housing.

30. The projection device according to claim 25, wherein the heat dissipation module further comprises a fourth heat exchange element, a fifth heat exchange element and a third heat conductive structure, the fourth heat exchange element is disposed inside the closed housing and located at a side edge of the wavelength conversion device, the fifth heat exchange element is disposed outside the closed housing, one end of the third heat conductive structure is connected to the fourth heat exchange element, the other end of the third heat conductive structure is connected to the fifth heat exchange element, wherein heat generated by the wavelength conversion device is transferred to the fifth heat exchange element by the fourth heat exchange element, a temperature of the fourth heat exchange element is higher than a temperature of the fifth heat exchange element, and the temperature of the fifth heat exchange element is lower than a temperature of the second heat exchange element.

31. The projection device according to claim 30, wherein a distance between the fifth heat exchange element and the closed housing is greater than a distance between the second heat exchange element and the closed housing, and the second heat exchange element is located between the fifth heat exchange element and the closed housing.

32. The projection device according to claim 30, wherein the fourth heat exchange element comprises a plurality of heat sink fins, some of the plurality of heat sink fins are arranged perpendicular to the first surface of the wavelength conversion device.

33. The projection device according to claim 30, wherein the fourth heat exchange element surrounds the side edge of the wavelength conversion device.

34. The projection device according to claim 30, wherein the fourth heat exchange element comprises at least two portions, the at least two portions are respectively located at two opposite side edges of the wavelength conversion device.

35. The projection device according to claim 30, wherein the heat dissipation module further comprises a third cooling element, the third cooling element is connected between the one end of the third heat conductive structure and the fourth heat exchange element.

36. The projection device according to claim 30, wherein the heat dissipation module further comprises at least one second fan, wherein the at least one second fan is disposed outside the closed housing, the at least one second fan is located on a side of the fifth heat exchange element away from the closed housing, between the fifth heat exchange element and the second heat exchange element or between the second heat exchange element and the closed housing, and the at least one second fan is configured to blow air from the fifth heat exchange element to the second heat exchange element.

37. The projection device according to claim 21, wherein the first heat conductive structure is formed integrally with the closed housing.

38. The projection device according to claim 21, wherein the heat dissipation module further comprises at least one first fan, the at least one first fan is disposed inside the closed housing and is configured to blow air cooled by the cold side of the first cooling element to the wavelength conversion device.

39. The projection device according to claim 38, wherein the heat dissipation module further comprises at least one stopper, the at least one stopper is located between the first heat exchange element and the wavelength conversion device and is configured to transfer the air blown by the at least one first fan from a center of the wavelength conversion device to the side edge of the wavelength conversion device.

40. A projection device, comprising a closed housing, a wavelength conversion device and a heat dissipation module, wherein:
the wavelength conversion device is located inside the closed housing and has a first surface and a second surface opposite each other, the wavelength conversion device rotates about a central axis, and the first surface is configured to receive an excitation beam; and
the heat dissipation module is configured to perform heat dissipation on the wavelength conversion device, and the heat dissipation module comprises a first heat exchange element, a first cooling element, a second heat exchange element and a first heat conductive structure, wherein:
the first heat exchange element is disposed inside the closed housing, wherein the first surface is located between the first heat exchange element and the second surface;
the first cooling element has a cold side and a hot side opposite each other, the first cooling element is entirely disposed inside the closed housing, and the cold side of the first cooling element is located between the hot side of the first cooling element and the first heat exchange element;
the second heat exchange element is disposed outside the closed housing; and
one end of the first heat conductive structure is connected to the hot side of the first cooling element, and the other end of the first heat conductive structure is directly connected to the second heat exchange element,
wherein the cold side of the first cooling element thermally contacts the first heat exchange element.

* * * * *